US009021250B2

(12) United States Patent
Overby, Jr.

(10) Patent No.: US 9,021,250 B2
(45) Date of Patent: Apr. 28, 2015

(54) SECURITY ENFORCEMENT POINT INSPECTION OF ENCRYPTED DATA IN AN ENCRYPTED END-TO END COMMUNICATIONS PATH

(75) Inventor: Linwood H. Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1323 days.

(21) Appl. No.: 11/738,500

(22) Filed: Apr. 22, 2007

(65) Prior Publication Data

US 2008/0263356 A1 Oct. 23, 2008

(51) Int. Cl.
H04L 29/06 (2006.01)
(52) U.S. Cl.
CPC .......... *H04L 63/0428* (2013.01); *H04L 63/062* (2013.01); *H04L 63/30* (2013.01)
(58) Field of Classification Search
USPC .............. 726/11, 12, 13, 15, 22, 23; 713/153, 713/154
See application file for complete search history.

(56) References Cited

U.S. PATENT DOCUMENTS

| 7,055,027 | B1 | 5/2006 | Gunter et al. | |
|---|---|---|---|---|
| 2003/0093691 | A1* | 5/2003 | Simon et al. | 713/201 |
| 2003/0188192 | A1* | 10/2003 | Tang et al. | 713/201 |
| 2008/0016550 | A1* | 1/2008 | McAlister | 726/1 |

FOREIGN PATENT DOCUMENTS

GB 2374497 A 10/2002

* cited by examiner

*Primary Examiner* — Brandon Hoffman
(74) *Attorney, Agent, or Firm* — Steven M. Greenberg, Esq.; CRGO LAW

(57) ABSTRACT

Embodiments of the present invention address deficiencies of the art in respect to security function processing of encrypted data in a security enforcement point and provide a method, system and computer program product for security enforcement point inspection of a traversing encrypted data in a secure, end-to-end communications path. In an embodiment of the invention, a method for security enforcement point inspection of encrypted data in a secure, end-to-end communications path can be provided. The method can include establishing a persistent secure session with a key server holding an SA for an end-to-end secure communications path between endpoints, receiving the SA for the end-to-end secure communications path over the persistent secure session, decrypting an encrypted payload for the end-to-end secure communications path using session key data in the SA, and performing a security function on the decrypted payload.

18 Claims, 2 Drawing Sheets

SECURITY ENFORCEMENT POINT INSPECTION OF ENCRYPTED DATA IN AN ENCRYPTED END-TO END COMMUNICATIONS PATH

BACKGROUND OF THE INVENTION

1. Field of the Invention

The present invention relates to the field of network security and more particularly to security enforcement point processing of encrypted data in a communications path.

2. Description of the Related Art

Internet security has increasingly become the focus of information technologists who participate in globally accessible computer networks. In particular, with the availability and affordability of broadband Internet access, even within the small enterprise, many computers and small computer networks enjoy continuous access to the Internet. Notwithstanding, continuous, high-speed access is not without its price. Specifically, those computers and computer networks which heretofore had remained disconnected from the security risks of the Internet now have become the primary target of malicious Internet malfeasors.

To address the vulnerability of computing devices exposed to the global Internet, information technologists intend to provide true, end-to-end security for data in the Internet through secure communications. The Internet Security Protocol, known in the art as "IPsec" represents a common form of secure communications for use over the Internet. In IPsec, communications between source and destination nodes over communications path in the Internet can be administered in accordance with a security association (SA). An SA can include one or more rules that define the IPsec processing that is applied to the communication. IPsec is defined in the Request for Comment (RFC) 2401 superseded by RFC 4301 among other RFCs.

In IPsec, whether the transmission of a packet is denied or permitted with or without IPsec processing is determined by matching the attributes of a packet within the security rules in a security policy database (SPD). To make this determination, both the static rules of a security policy and dynamic rules negotiated as part of an Internet Key Exchange (IKE), each of which refers to an SA as described in RFC 2401, can be subjected to a filtered search in the order of most specific to least specific attributes for both outgoing and incoming packets. The filtering of the attributes of a packet within the security rules can be based upon the source and destination address for the paired nodes engaging in secured communications.

The secured communications path defined between two IPsec endpoints often incorporate one or more security enforcement points such as a virtual private network (VPN)/firewall. Security enforcement points generally are no different than any other computing device excepting that the computing device supporting a security enforcement point hosts logic including program code enabled to support security services such as IP packet filtering, intrusion detection, load balancing and quality of service (QoS) setting management. Security enforcement points also perform IPsec SA endpoint management where the security enforcement point also functions as an IPsec endpoint. Security enforcement points, however, often are positioned in the midst of an IPsec secure communications path and perform no IPsec SA processing. In this circumstance, a security enforcement point positioned within the secure communications path will have no access to cleartext data in a traversing IPsec SA. Consequently, the security function of a security enforcement point in a secure IPsec communications path will have become inoperable as most security functions require access to unencrypted, cleartext data.

U.S. Pat. No. 7,055,027 to Gunter et al. for SYSTEM AND METHOD FOR TRUSTED INSPECTION OF A DATA STREAM relates to the problem of intermediately disposed security enforcement points in a secure communications path. As taught in Gunter, to permit the inspection of data within a secure communications path, an encrypted form of the session key can be received from an originating IPsec endpoint so as to be able to decrypt data flowing from the originating IPsec endpoint to a terminating IPsec endpoint in the secure communications path. Of course, to do so requires the originating IPsec endpoint to have knowledge of the security enforcement point. Moreover, to do so requires knowledge of the public key of the security enforcement point in the originating IPsec endpoint.

Gunter, however, does not provide anything other than the encrypted form of the session key. In fact, Gunter fails to pass an indication of an encryption algorithm to use with the session key, nor does Gunter provide sufficient information to identify a relevant SA. Thus, in Gunter, an enforcement point cannot match a received packet to an SA. Thus, the integral coupling of the originating IPsec endpoint to the security enforcement point inhibits scalability in a model where one or more security enforcement points are positioned within the secure communications path on an ad hoc basis.

BRIEF SUMMARY OF THE INVENTION

Embodiments of the present invention address deficiencies of the art in respect to security function processing of encrypted data in a security enforcement point and provide a novel and non-obvious method, system and computer program product for security enforcement point inspection of a traversing encrypted data in a secure, end-to-end communications path. In an embodiment of the invention, a method for security enforcement point inspection of encrypted data in a secure, end-to-end communications path can be provided. The method can include establishing a persistent secure session with a key server holding an SA for an end-to-end secure communications path between endpoints, receiving the SA for the end-to-end secure communications path over the persistent secure session, decrypting an encrypted payload for the end-to-end secure communications path using session key data in the SA, and performing a security function on the decrypted payload.

In another embodiment of the invention, a network data processing system can be configured for security enforcement point inspection of encrypted data in a secure, end-to-end communications path. The system can include two IPsec endpoints coupled to one another over a computer communications network and configured to establish an end-to-end secure communications path defined between the IPsec endpoints and in association with an SA for the end-to-end secure communications path. The system further can include at least one security enforcement point disposed intermediately to the IPsec endpoints. Finally, the system can include a key server configured for communicative linkage with the security enforcement point and at least one of the IPsec endpoints. Specifically, the key server can include program code enabled to establish a secure session with the security enforcement point and to provide the SA to the security enforcement point for use in decrypting an encrypted payload traversing the security enforcement point in the end-to-end secure communications path between the IPsec endpoints.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for security enforcement point inspection of encrypted data in a secure, end-to-end communications path. In accordance with an embodiment of the present invention, a security enforcement point disposed within a secure communications path such as that defined between IPsec endpoints, can establish a secure encrypted session with a key server. Once the secure encrypted session has been established, copies of IPsec SAs established between the key server and one of the IPsec endpoints can be securely provided to the security enforcement point. The security enforcement point, in turn, can install the received IPsec SAs so as to decrypt traversing data originating from corresponding IPsec endpoints into cleartext so as to perform one or more security functions provided by the security enforcement point even though the security enforcement remains amidst a secure communications path established between the IPsec endpoints.

Figure 1:
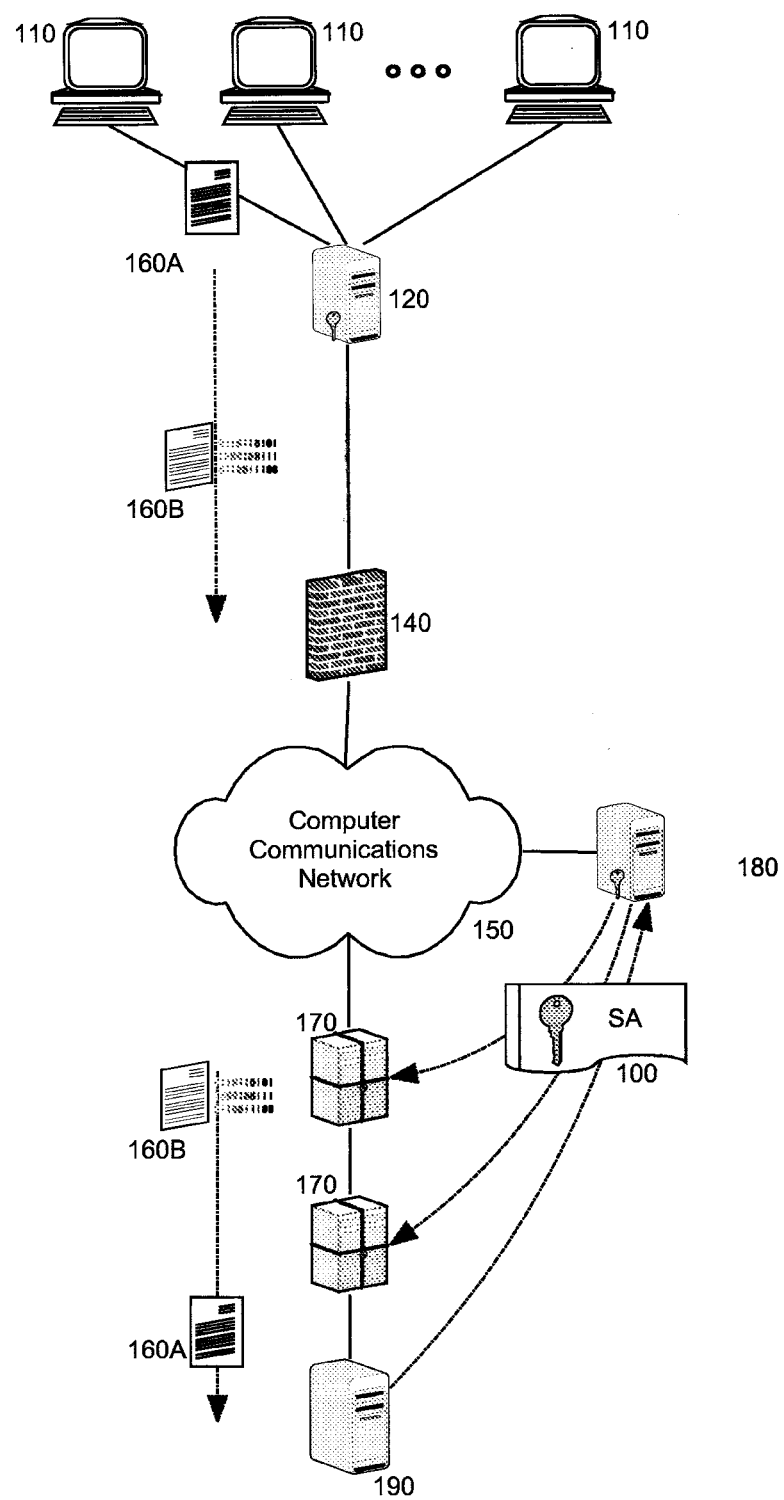
FIG. 1 is a schematic illustration of a network data processing system configured for security enforcement point inspection of encrypted data in a secure, end-to-end communications path; and, FIG. 2 is a flow chart illustrating a process for security enforcement point inspection of encrypted data in a secure, end-to-end communications path.

In illustration, FIG. 1 depicts a network data processing system configured for security enforcement point inspection of encrypted data in a secure, end-to-end communications path. The system can include one or more client computing devices 110 communicatively coupled to a server computing device 190 over a computer communications network 150. Each of the client computing devices 110 can be configured for end-to-end secure communications with the server computing device 190, for instance through the establishment of a VPN tunnel utilizing IPsec. To that end, a secure server 120 can be coupled to each of the client computing devices 110 and enabled to establish a VPN tunnel with the server computing device 190 on behalf of the client computing devices 110. Optionally, a firewall 140 can be disposed between the secure server 120 and the computer communications network 150 so as to limit the flow of traffic there between according to security rules.

One or more security enforcement points 170 can be positioned intermediately between the firewall 140 and the server computing device 190 in the midst of the end-to-end secure communications path. The security enforcement points 170 can be configured to perform any of several security functions, ranging from packet filtering and intrusion detection to load balancing and QoS management. Notably, as shown in FIG. 1, each of the security enforcement points 170 can be coupled to a key server 180. The key server 180 in turn can be coupled to the server computing device 190 and, in consequence, can maintain an awareness of an SA 100 for the end-to-end secure communications path established by the secure server 120 with the server computing device 190.

In operation, an end-to-end secure communications path can be established between an individual one of the client computing devices 110 and the server computing device 190. In the course of establishing the end-to-end secure communications path, an IPsec SA for the end-to-end secure communications path can be provided to key server 180. In one aspect of the embodiment, before loading the SA into the TCP/IP stack for the secure server 190 thus enabling the end-to-end secure communications path, the SA can be provided to each of the security enforcement points 170 by the key server 180 over a long-standing secure link such as a VPN tunnel between each of the security enforcement points 170 and the key server 180. Finally, the key server 180 can notify the server computing device 190 and the server computing device 190 can load the SA into its TCP/IP stack. It will be recognized by the skilled artisan, however, that if the SA were installed immediately at the endpoint, potentially some encrypted packets may not be decryptable at the enforcement points 170 since the enforcement points 170 may not yet have the negotiated SA. In this circumstance, the enforcement points 170 can be configured to either discard received packets or let the packets go un-inspected.

Thereafter, a cleartext payload 160A can be transformed into an encrypted payload 160B and transmitted over the end-to-end secure communications path to the server computing device 190 where the encrypted payload 160B can be decrypted into cleartext. At each of the security enforcement points 170 there between, however, the encrypted payload 160B can be decrypted for use in performing associated security functions through the knowledge provided by the SA 100 for the end-to-end secure communications path. As a result, the intermediately disposed security enforcement points 170 can perform security functions on decrypted cleartext without requiring knowledge of the client computing devices 110 and without requiring the client computing devices 110 or the secure server 120 to have knowledge of the security enforcement points 170.

Figure 2:
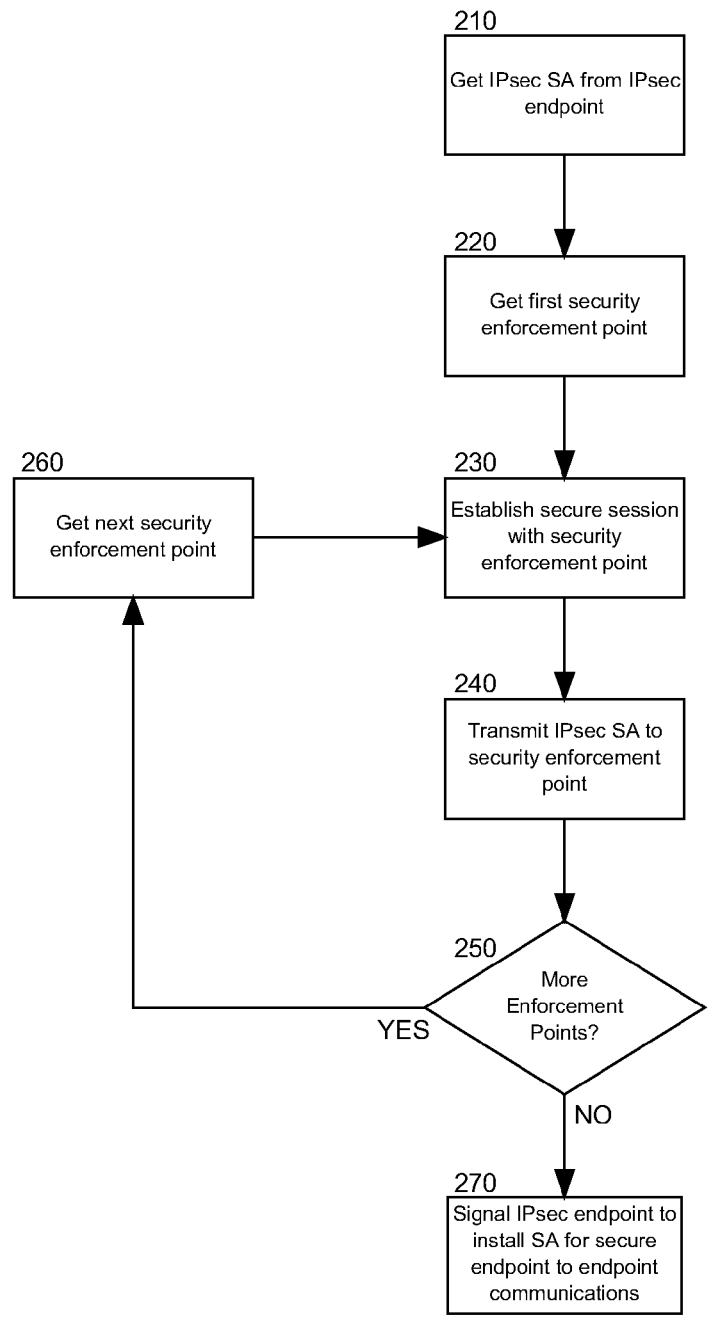

In further illustration, FIG. 2 is a flow chart illustrating a process for security enforcement point inspection of encrypted data in a secure, end-to-end communications path. Beginning in block 210, an IPsec SA can be received in a key server from an IPsec endpoint during the setup of a VPN tunnel with another IPsec endpoint. In block 220, a first intermediately disposed security enforcement point can be identified in the end-to-end secure communications path. Once the security enforcement point has been identified, in block 230 a persistent secure session can be established (if not already established) with the security enforcement point, such as through a transport layer security (TLS) session, so that an end-to-end secure communications path exists not only between both IPsec endpoints, but also separately with the security enforcement point and the key server.

In block 240, an IPsec SA for the end-to-end secure communications path between the IPsec endpoints can be provided to the security enforcement point across the separate end-to-end secure communications path between the key server and the security enforcement point. Subsequently, in decision block 250 if additional security enforcement points intermediate to the IPsec endpoints remain to be processed, in block 260 a next security enforcement point can be retrieved and the process can repeat through block 230. When no further security enforcement points intermediate to the IPsec endpoints remain to be processed, in block 270 the IPsec endpoint can be signaled to complete installation of the SA for the end-to-end secure communications path and the security enforcement points can perform security functions on the encrypted data transmitted between the IPsec endpoints due to the session key knowledge incorporated into the SA for the IPsec endpoints.

Optionally, whereas the SA provided to the security enforcement point can include an encryption key enabling the security enforcement point to access cleartext within encrypted data traversing the security enforcement point, the session authentication key can be withheld. In this regard, by withholding the session authentication key, in essence the cleartext decrypted from the encrypted data provided to the security enforcement point will effectively be "read only" in that without the session authentication key, the enforcement point will lack authorization to alter the content of the cleartext. Conversely, the session authentication key can be provided to the security enforcement point to permit alteration of the cleartext including deleting or blocking selected portions of the cleartext.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. With specific reference to a computer usable storage medium, it is to be understood that a computer usable storage medium excludes transitory media such as transitory signals and other propagation media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for security enforcement point inspection of encrypted data in a secure, end-to-end communications path, the method comprising:

identifying a security enforcement point defined between endpoints;

establishing a persistent secure session between the identified enforcement point and a key server holding a security association (SA) for an end-to-end secure communications path between the endpoints, such that a separate end-to-end secure communication path exists between the key server and the identified security enforcement point from the end-to-end secure communications path that exists between the endpoints;

receiving, at the identified security enforcement point, the SA for the end-to-end secure communications path between the endpoints over the persistent secure session;

installing, at the identified security enforcement point, the SA upon receiving the SA;

decrypting, at the identified security enforcement point, an encrypted payload for the end-to-end secure communications path between the endpoints using session key data in the SA; and performing, at the identified security enforcement point, a security function on the decrypted payload without requiring knowledge of the endpoints at the identified security enforcement point and also without the endpoints having knowledge of the identified security enforcement point.

2. The method of claim 1, further comprising:

receiving an additional SA for a different end-to-end secure communications path for a different security enforcement point over the persistent secure session;

decrypting an additional encrypted payload for the different end-to-end secure communications path for the different security enforcement point using session key data in the additional SA; and performing, by the different security enforcement point, a security function on the decrypted additional payload.

3. The method of claim 1, wherein
the security function includes packet filtering on the decrypted payload.

4. The method of claim 1, wherein
the security function includes intrusion detection on the decrypted payload.

5. The method of claim 1, wherein
the security function includes load balancing on the decrypted payload.

6. The method of claim 1, wherein
the security function includes quality of service (QoS) management on the decrypted payload.

7. The method of claim 1, wherein
establishing the persistent secure session between the identified enforcement point and the key server holding the SA comprises establishing a transport layer security (TLS) session with the key server and the identified security enforcement point.

8. The method of claim 1, further comprising
withholding a session authentication key associated with the SA so that cleartext in the decrypted payload provided to the identified security enforcement point is read-only.

9. A network data processing system configured for security enforcement point inspection of encrypted data in a secure, end-to-end communications path, the system comprising:
two Internet security (Ipsec) endpoints
coupled to one another over a computer communications network and
configured to establish an end-to-end secure communications path defined between the IPsec endpoints and in association with a security association (SA) for the end-to-end secure communications path;
at least one security enforcement point disposed intermediately to the IPsec endpoints configured to receive a security association (SA) for the end-to-end secure communications path defined between the IPsec endpoints, to install the SA upon receiving the SA, to decrypt an encrypted payload using session key data in the SA, to perform a security function on the decrypted payload without requiring knowledge of the IPsec endpoints at the security enforcement point and also without the IPsec endpoints having knowledge of the security enforcement point; and,
a key server configured for communicative linkage with the security enforcement point and at least one of the IPsec endpoints, the key server comprising program code enabled
to identify a security enforcement point
to establish a secure session with the identified security enforcement point, such that a separate end-to-end secure communication path exists between the key server and the identified security enforcement point from the end-to-end secure communications path that exists between the IPsec endpoints and
to provide the SA to the identified security enforcement point for use in decrypting an encrypted payload traversing the security enforcement point in the end-to-end secure communications path between the IPsec endpoints.

10. The system of claim 9, wherein the secure session is a transport layer security (TLS) session.

11. A computer program product comprising a computer usable storage medium having stored therein computer usable program code for security enforcement point inspection of encrypted data in a secure, end-to-end communications path, the computer usable program code which when executed by a security enforcement point hardware system, causing the security enforcement point hardware system to perform
identifying a security enforcement point defined between endpoints;
establishing a persistent secure session between the identified enforcement point and a key server holding a security association (SA) for an end-to-end secure communications path between the endpoints, such that a separate end-to-end secure communication path exists between the key server and the identified security enforcement point from the end-to-end secure communications path that exists between the endpoints;
receiving, at the identified security enforcement point, the SA for the end-to-end secure communications path between the endpoints over the persistent secure session;
installing, at the identified security enforcement point, the SA upon receiving the SA;
decrypting, at the identified security enforcement point, an encrypted payload for the end-to-end secure communications path between the endpoints using session key data in the SA; and
performing, at the identified security enforcement point, a security function on the decrypted payload without requiring knowledge of the endpoints at the identified security enforcement point and also without the endpoints having knowledge of the identified security enforcement point.

12. The computer program product of claim 11, wherein the security enforcement point hardware system is further caused to perform:
receiving an additional SA for a different end-to-end secure communications path for a different security enforcement point over the persistent secure session;
decrypting an additional encrypted payload for the different end-to-end secure communications path for the different security enforcement point using session key data in the additional SA; and,
performing, by the different security enforcement, a security function on the decrypted additional payload.

13. The computer program product of claim 11, wherein the security function includes packet filtering on the decrypted payload.

14. The computer program product of claim 11, wherein the security function includes intrusion detection on the decrypted payload.

15. The computer program product of claim 11, wherein the security function includes load balancing on the decrypted payload.

16. The computer program product of claim 11, wherein the security function includes quality of service (QoS) management on the decrypted payload.

17. The computer program product of claim 11, wherein establishing the persistent secure session between the identified enforcement point and the key server holding the SA comprises establishing a transport layer security (TLS) session with the key server and the identified security enforcement point.

18. The computer program product of claim 11, wherein the security enforcement point hardware system is further caused to perform:
withholding a session authentication key associated with the SA so that cleartext in the decrypted payload provided to the identified security enforcement point is read-only.

* * * * *